W. HOPPIE.
RESERVE CELL.
APPLICATION FILED NOV. 17, 1919.
1,402,070.
Patented Jan. 3, 1922.
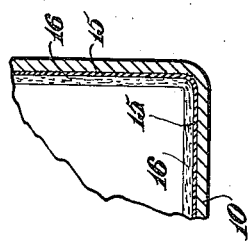
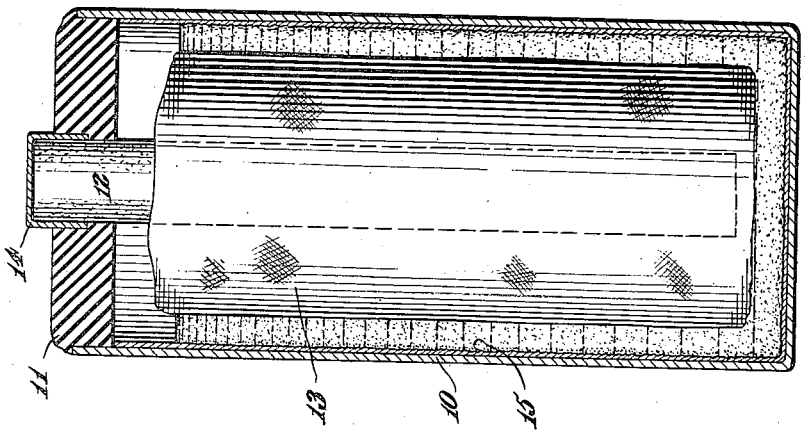
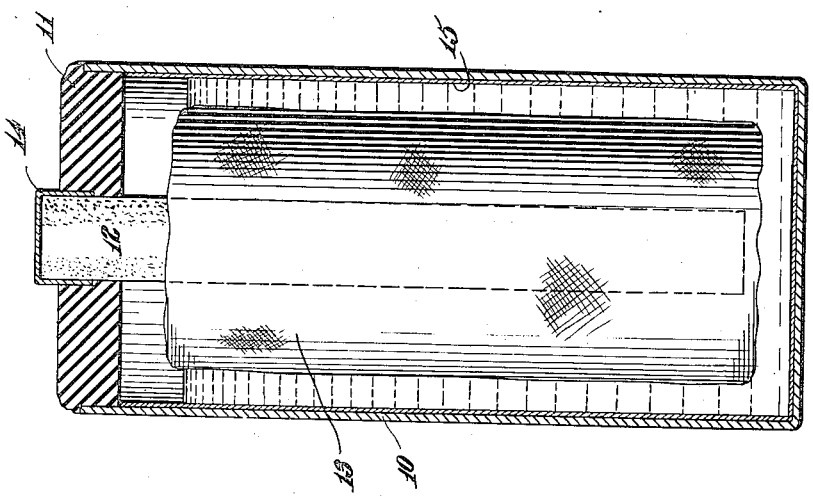
Inventor
William Hoppie
By his Attorneys
Kerr Page Cooper & Hayward

UNITED STATES PATENT OFFICE.

WILLIAM HOPPIE, OF NEWARK, NEW JERSEY, ASSIGNOR TO NATIONAL CARBON COMPANY, INC., OF NEW YORK, N. Y., A CORPORATION OF NEW YORK.

RESERVE CELL.

1,402,070.  Specification of Letters Patent.  Patented Jan. 3, 1922.

Application filed November 17, 1919. Serial No. 338,733.

*To all whom it may concern:*

Be it known that I, WILLIAM HOPPIE, being a citizen of the United States, residing at Newark, in the county of Essex and State of New Jersey, have invented certain new and useful Improvements in Reserve Cells, of which the following is a full, clear, and exact description.

This invention has for its object the provision of an improved reserve primary cell in which no operations are necessary by the user to render the cell active other than placing the cell in electric circuit.

In the battery art, numerous reserve cells of the primary type have been proposed in which the user is required to perform a certain operation in order to put the cell in condition for service. Among these may be mentioned the adding of water, placing the cell in water, placing the parts of the cell together, pressing down or screwing the top of the cell to force electrolyte into contact with the elements, heating the cell, removing a tape from the cell, punching a hole in a container inside the cell and thereby liberate the active material and numerous other manipulations all of which have somewhat detracted from the commercial value of this class of inventions.

The present invention has for its object the provision of a reserve cell having the attendant advantages of reserve cells heretofore proposed but in which no manual manipulation is required to render the cell active.

The present invention is based upon the discovery that a certain class of substances or compounds have the property of protecting an electrode against deterioration when the cell is on open circuit, but which do not entirely prevent the output of electric energy by the cell. These substances have the further property of decreasing, if not entirely ceasing, their property of protecting the electrode after a certain quantity of current has been taken from the cell.

In the drawings:

Fig. 1 shows a sectional view of my improved cell in reserve condition.

Fig. 2 shows the cell after the same is placed in a circuit and after a short time has elapsed.

Fig. 3 shows a view of a modification.

My improved primary cell in general construction resembles numerous cells now on the market.

It comprises a zinc container electrode 10 having at its upper end the usual seal 11 supporting a carbon rod 12 around which is molded a mix of depolarizing material which is contained in cloth bag 13. This is the usual bobbin type electrode of the well known type. The upper end of the carbon rod is capped as shown at 14.

The container is adapted to contain the usual electrolyte which may be a pasty or jelly-like substance comprised of salammoniac, zinc chloride and flour or starch paste. The exact combination making up the electrolyte may be widely varied in accordance with numerous formulæ well known in the art.

In order to prevent so-called shelf deterioration I employ a coating, covering or surface for one of the electrodes, preferably the interior of the zinc electrode. The material employed for this coating is of such character that when the cell is on initial open circuit the coating restrains the action of the electrolyte upon the electrode, but when the cell is placed in circuit and current is drawn therefrom the coating is in part broken up, driven away from the electrode, commingled or chemically united with the electrolyte, thereby permitting the normal action in the cell. It is one of the features of the coating that the diminution of protection is caused directly by the flow of current generated by the cell. A further characteristic of a cell having an interior coating of this character is that the cell shows initially substantially normal voltage but low amperage, but after a short period of service and the lapse of time shows increased amperage.

I found that a coating of viscous material such as gelatin is a suitable substance for the inner coating 15 of the electrode. The gelatin is preferably coated upon the electrode and allowed to set before the electrolyte is added. The cell is then assembled in the usual manner.

I do not desire to be restricted to the particular substance set forth above as I have found that numerous other substances have the same characteristics when used as an electrode coating. Among these may be mentioned the following: glue, isinglass, glucose, flour, paste, agar agar and numerous other substances.

As an example of the performance of a cell made in accordance with this invention I have found by experiment that a certain cell showed an open circuit voltage of 1.5, an initial closed circuit amperage of 1 and after 30 minutes on closed circuit the amperage increased to 5. From the above it follows that the initial voltage was sufficient to give a bright light in a flashlight and perform satisfactorily as far as the user was concerned, and that the amperage and chemical activity increased considerably after a short period of use.

Reserve cells made in accordance with the present invention may also be activated by putting the cell in an electric circuit supplied by an outside source of electricity as by connecting to the terminals of another cell. This mode of activating the cell would expedite the activating action. In the present application I desire to claim broadly a primary reserve cell activated by the passage of current from an outside source as well as a cell activated by the passage of current generated by the cell itself.

The exact phenomena which occurs is not exactly clear. It is my belief however that some electrolyte permeates the gelatin and reaches the zinc when on open circuit. The amount, however, is not sufficient to cause harmful deterioration to any great extent. After being on closed circuit the gelatin appears to have been partly or wholly dissociated from the zinc and distributed in the cell electrolyte where it no longer causes appreciable resistance to electro-chemical activity.

It is well known that when gelatin, flour pastes and like substances, when mixed with an electrolyte such as one containing zinc chloride or an equivalent substance and an electric current is passed through the mixture, the pastes or gelatin break up and liberate moisture. This tendency also exists to slight extent without the passage of current but the zinc chloride content of a new cell is comparatively low and increases after a period of service. This increase of zinc chloride content accelerates the the breaking down of the pastes or gelatins and it may be that the action of my improved cell is partially dependent upon the above phenomena for the results attained.

Fig. 3 shows a modification in which the zinc electrode 10 is lined with a bibulous paper lining 16 and in which the coating of gelatin 15 is intermediate the zinc and the bibulous paper lining. The bibulous paper contains the electrolyte. The gelatin acts as heretofore explained, when the cell is placed in circuit. It dissociates to such an extent as to permeate the bibulous paper and permit the access of the electrolyte to the zinc. The form illustrated in Figs. 1 and 2 is the preferred form.

What I claim is:

1. In an electric cell, a positive and negative electrode and an electrolyte, a protective coating on one of said electrodes adapted to minimize shelf deterioration, said coating having such chemical and physical characteristics as to have its protecting action diminished after the cell has been placed in circuit by the flow of the current generated by the cell.

2. In an electric cell, a pair of electrodes, an electrolyte, a protective material on one of said electrodes having such chemical and physical characteristics as to protect the electrode from the action of the electrolyte during the time the cell is on initial open circuit and to discontinue such protection upon the drawing of a quantity of current from the cell.

3. A cell comprising in combination a zinc container electrode, a second electrode, a gelatin-like protecting coating upon the interior of the zinc container electrode and an electrolyte in said cell, said coating being adapted to afford substantial protection to the zinc when the cell is on initial open circuit and adapted to be displaced by the initial withdrawal of current from the cell.

4. A reserve cell having means therein for rendering the cell fully active by the withdrawal of current therefrom.

5. A reserve cell having means therein for rendering the cell fully active by connecting the cell to a load.

6. A reserve cell having an initial approximately normal voltage and low amperage and having approximately normal amperage after connecting the cell to a load circuit for a time period.

7. In an electric cell, a positive electrode and a negative electrode and a suitable electrolyte, a viscous coating on one of the electrodes, said coating being adapted to commingle with the electrolyte upon the withdrawal of current from the cell.

8. In an electric cell, a positive electrode, a negative electrode and a suitable electrolyte, a coating for one of said electrodes of such chemical and physical characteristics as to substantially impede the action of the electrolyte upon the electrode until such time as current is withdrawn from cell.

9. In an electric cell, having a pair of electrodes, a suitable electrolyte, a coating for one of said electrodes of such character that it will protect the electrode when the cell is on initial open circuit, said coating upon the flow of current in the cell being adapted to break down and liberate moisture whereby the activity of the cell is materially increased.

10. A primary reserve cell having means therein for rendering the cell fully active by the passage of an electric current therethrough.

11. A primary reserve cell having means therein for rendering the cell fully active by the passage of an electric current, supplied from a supplementary source, therethrough.

12. A primary reserve cell having means therein for rendering the cell fully active by the passage of an electric current therethrough, said current being in part that generated by the cell itself and in part current supplied from a supplementary source.

In testimony whereof I hereunto affix my signature.

WILLIAM HOPPIE.